(12) United States Patent
Armitage

(10) Patent No.: US 10,339,034 B2
(45) Date of Patent: Jul. 2, 2019

(54) DYNAMICALLY GENERATED DEVICE TEST POOL FOR STAGED ROLLOUTS OF SOFTWARE APPLICATIONS

(71) Applicant: Google Inc., Mountain View, CA (US)

(72) Inventor: Peter John Armitage, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/625,041

(22) Filed: Jun. 16, 2017

(65) Prior Publication Data
US 2018/0365131 A1   Dec. 20, 2018

(51) Int. Cl.
G06F 9/44    (2018.01)
G06F 11/36   (2006.01)
G06F 8/65    (2018.01)
G06F 9/50    (2006.01)

(52) U.S. Cl.
CPC .......... *G06F 11/3676* (2013.01); *G06F 8/65* (2013.01); *G06F 9/5061* (2013.01); *G06F 11/3664* (2013.01); *G06F 11/3672* (2013.01); *G06F 2209/5011* (2013.01)

(58) Field of Classification Search
CPC .................................................. G06F 11/3676
USPC .................. 717/168–174, 123–133
See application file for complete search history.

(56) References Cited

U.S. PATENT DOCUMENTS

| | | | | |
|---|---|---|---|---|
| 6,944,848 B2* | 9/2005 | Hartman | .................. | G06F 8/30 714/E11.208 |
| 7,062,427 B2* | 6/2006 | Walther | .............. | G06F 17/5045 703/14 |
| 7,174,547 B2* | 2/2007 | Wang | ........................ | G06F 8/65 709/221 |
| 7,246,351 B2* | 7/2007 | Bloch | ....................... | G06F 8/61 715/700 |
| 7,266,805 B2* | 9/2007 | Weidman | .................. | G06F 8/71 717/101 |
| 7,558,843 B2 | 7/2009 | Lipscomb et al. | | |
| 7,657,872 B2* | 2/2010 | Kelbaugh | ........... | G06F 11/3664 714/38.1 |

(Continued)

FOREIGN PATENT DOCUMENTS

WO   2012098478 A1   7/2012
WO   2017007488 A1   1/2017

OTHER PUBLICATIONS

Cadar et al, "Multi-version Software Updates", IEEE, pp. 36-40, 2012.*

(Continued)

*Primary Examiner* — Anil Khatri
(74) *Attorney, Agent, or Firm* — Shumaker & Sieffert, P.A.

(57) ABSTRACT

A method includes receiving, by a computing system that includes an application repository, an updated version of an application. The method also includes determining whether the particular computing device contributes additional test scope for the updated version of the application beyond existing test scope for the updated version of the application that is contributed by the group of computing devices. The method further includes, sending the updated version of the application to the particular computing device for installation in response to determining that the particular computing device contributes additional test scope.

22 Claims, 4 Drawing Sheets

(56) References Cited

U.S. PATENT DOCUMENTS

| | | | | |
|---|---|---|---|---|
| 7,676,506 B2* | 3/2010 | Reinsch | G06F 8/658 | 717/169 |
| 7,721,259 B2* | 5/2010 | Heinke | G06F 9/44505 | 717/121 |
| 7,853,926 B2* | 12/2010 | Blouin | G06F 11/263 | 709/221 |
| 8,117,596 B2* | 2/2012 | Thorley | G06F 8/71 | 717/120 |
| 8,196,112 B1* | 6/2012 | Cansizlar | G06F 17/30905 | 717/116 |
| 8,230,397 B2* | 7/2012 | Farrell | G06F 8/71 | 714/2 |
| 8,255,879 B2* | 8/2012 | Wenger | G06F 11/3466 | 717/130 |
| 8,578,337 B2* | 11/2013 | Van Riel | G06F 8/60 | 717/124 |
| 8,739,128 B1* | 5/2014 | Cohen | G06F 11/3672 | 717/124 |
| 8,752,019 B2* | 6/2014 | Marquardt | G06F 11/0796 | 717/124 |
| 8,978,009 B2* | 3/2015 | Mizrahi | G06F 11/3676 | 717/122 |
| 9,026,998 B2* | 5/2015 | Mizrahi | G06F 11/368 | 717/124 |
| 9,032,371 B2* | 5/2015 | Hansson | G06F 11/3692 | 714/38.1 |
| 9,053,435 B2* | 6/2015 | Krukow | G06F 11/3664 | |
| 9,396,092 B1 | 7/2016 | Kuo et al. | | |
| 9,626,176 B2* | 4/2017 | Thomas | G06F 8/65 | |
| 9,830,142 B2* | 11/2017 | Thomas | G06F 8/65 | |
| 2006/0009996 A1 | 1/2006 | Lipscomb et al. | | |
| 2006/0248116 A1 | 11/2006 | Sobel | | |
| 2015/0143345 A1 | 5/2015 | Patton et al. | | |
| 2017/0132123 A1 | 5/2017 | Ditullio et al. | | |

OTHER PUBLICATIONS

Neamtiu et al, "Contextual Effects for Version-Consistent Dynamic Software Updating and Safe Concurrent Programming", ACM, pp. 37-49, 2007.*

Previtali et al, "Extracting Updating Aspects from Version Differences", ACM, pp. 1-5, 2008 (Year: 2008).*

Hosek et al, "Safe Software Updates via Multi-version Execution", IEEE, pp. 612-621, 2013 (Year: 2013).*

Cadar et al, "Multi-version Software Updates", IEEE, pp. 36-40, 2012 (Year: 2012).*

Wong et al, "Managing and Querying Multi-Version XML Data with Upda to Logging", ACM, pp. 74-81, 2002 (Year: 2002).*

Neamtiu et al, "Contextual Effects for Version-Consistent Dynamic Software Updating and Safe Concurrent Programming", ACM, pp. 37-49, 2007 (Year: 2007).*

Palikareva et al, "Shadow of a Doubt: Testing for Divergences Between Software Versions", ACM, pp. 1181-1192, 2016 (Year: 2016).*

International Search Report and Written Opinion from International Application No. PCT/US2018/019079, dated Jun. 1, 2018, 14 pp.

Demand Request and Response to Written Opinion dated Jun. 1, 2018 from International Application No. PCT/US2018/019079, filed Aug. 17, 2018, 10 pp.

* cited by examiner

300 ↗

304

| Candidate Device ID | RAM Actual | RAM Category | Storage Actual | Storage Category | Screen Size Actual | Screen Size Category | OS Version Actual | OS Version Category | Country | Language |
|---|---|---|---|---|---|---|---|---|---|---|
| A | 2GB | Medium | 32GB | Medium | 4.6" | Low | 7.1 | 7 | US | English |
| B | 3GB | High | 64GB | High | 5.5" | High | 6.0 | 6 | GB | English |

306A 306B 308A 308B 310A 310B 312A 312B 314 316

302 ↗

305

| Test Pool ID | RAM Actual | RAM Category | Storage Actual | Storage Category | Screen Size Actual | Screen Size Category | OS Version Actual | OS Version Category | Country | Language |
|---|---|---|---|---|---|---|---|---|---|---|
| A | 1GB | Low | 16GB | Low | 5.1" | Medium | 5.1 | 5 | JP | Japanese |
| B | 3GB | High | 64GB | High | 5.5" | High | 6.0 | 6 | GB | English |
| C | 3GB | High | 32GB | Medium | 4.8" | Medium | 7.0 | 7 | US | Spanish |
| D | 2GB | Medium | 8GB | Low | 4.6" | Low | 6.1 | 6 | FR | French |
| . . . | | | | | | | | | | |
| N | 6GB | High | 128GB | High | 6.0" | High | 7.2 | 7 | AU | English |

DYNAMICALLY GENERATED DEVICE TEST POOL FOR STAGED ROLLOUTS OF SOFTWARE APPLICATIONS

BACKGROUND

Some computing systems host an application repository or other type of digital distribution platform for delivering computing software (e.g., applications) to computing devices. The computing system may distribute updated versions of an application in stages as part of a multi-staged rollout. In a multi-staged rollout, the computing system may distribute the updated version of the application to a limited group of computing devices in a test pool during a first stage so as to identify any major errors or bugs in the application. After fixing any errors identified in the first stage, the computing system may distribute the updated version of the application to a broader group of computing devices (e.g., any computing device requesting the application) during a second, subsequent stage of the staged rollout. In some cases, an error in the updated version of the application may only affect certain types of computing devices; such errors may go undetected during the first stage of a rollout if the group of computing devices being tested in the first stage do not sufficiently represent the types of computing devices that are affected by the error.

SUMMARY

The disclosed subject matter relates to techniques for dynamically generating a device test pool for staged rollouts of software applications. A computing system may receive an updated version of an application from an application developer. The computing system may dynamically generate a test pool of computing devices to test the updated version of the application during a first stage of a staged rollout. In contrast to other computing systems that may designate computing devices for test pools on a random basis or based on a predetermined set of characteristics (e.g., devices in a certain country, or devices with a predetermined set of hardware and/or software components), the computing system may increase the diversity of a test pool by selecting candidate computing devices that contribute additional test scope beyond the test scope provided by computing devices already in the test pool. In other words, before including a computing device in a test pool, the computing system may confirm that the candidate computing device includes characteristics that increase the probability that errors in the updated version of the application will be detected during the first stage of the rollout. By distributing the updated version of the application to computing devices that contribute additional test scope, the computing system may limit the number of computing devices that receive the updated version of the application during the first stage of a staged rollout while potentially increasing the diversity of the computing devices and therefore increasing the probability that errors in the application will be detected before subsequent stages of the staged rollout.

In one example, a method includes receiving, by a computing system that includes an application repository, an updated version of an application. The method also includes determining, by the computing system, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices. The method further includes, responsive to determining that the particular computing device contributes additional test scope for the updated version of the application beyond the existing test scope for the updated version of the application that is contributed by the group of computing devices: adding, by the computing system, the particular computing device to the group of computing devices; and providing, by the computing system, the updated version of the application for installation at the particular computing device.

In another example, a computing system includes at least one processor and a memory. The memory includes instructions that, when executed by the at least one processor, cause the at least one processor to receive an updated version of an application; and determine, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices. The memory also includes instructions that cause the at least one processor to, responsive to determining that the particular computing device contributes additional test scope for the updated version of the application beyond the existing test scope for the updated version of the application that is contributed by the group of computing devices: add the particular computing device to the group of computing devices; and provide the updated version of the application for installation at the particular computing device.

In another example, a computer-readable storage medium is encoded with instructions that, when executed by at least one processor of a computing device, cause the at least one processor to receive an updated version of an application; and determine, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices. The instructions further cause the at least one processor to, responsive to determining that the particular computing device contributes additional test scope for the updated version of the application beyond the existing test scope for the updated version of the application that is contributed by the group of computing devices: add the particular computing device to the group of computing devices; and provide the updated version of the application for installation at the particular computing device.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3 is a conceptual diagram illustrating example details of data structures used to store information for dynamically generating a test pool for a staged rollout of a software application, in accordance with one or more aspects of the present disclosure.

DETAILED DESCRIPTION

Figure 1:
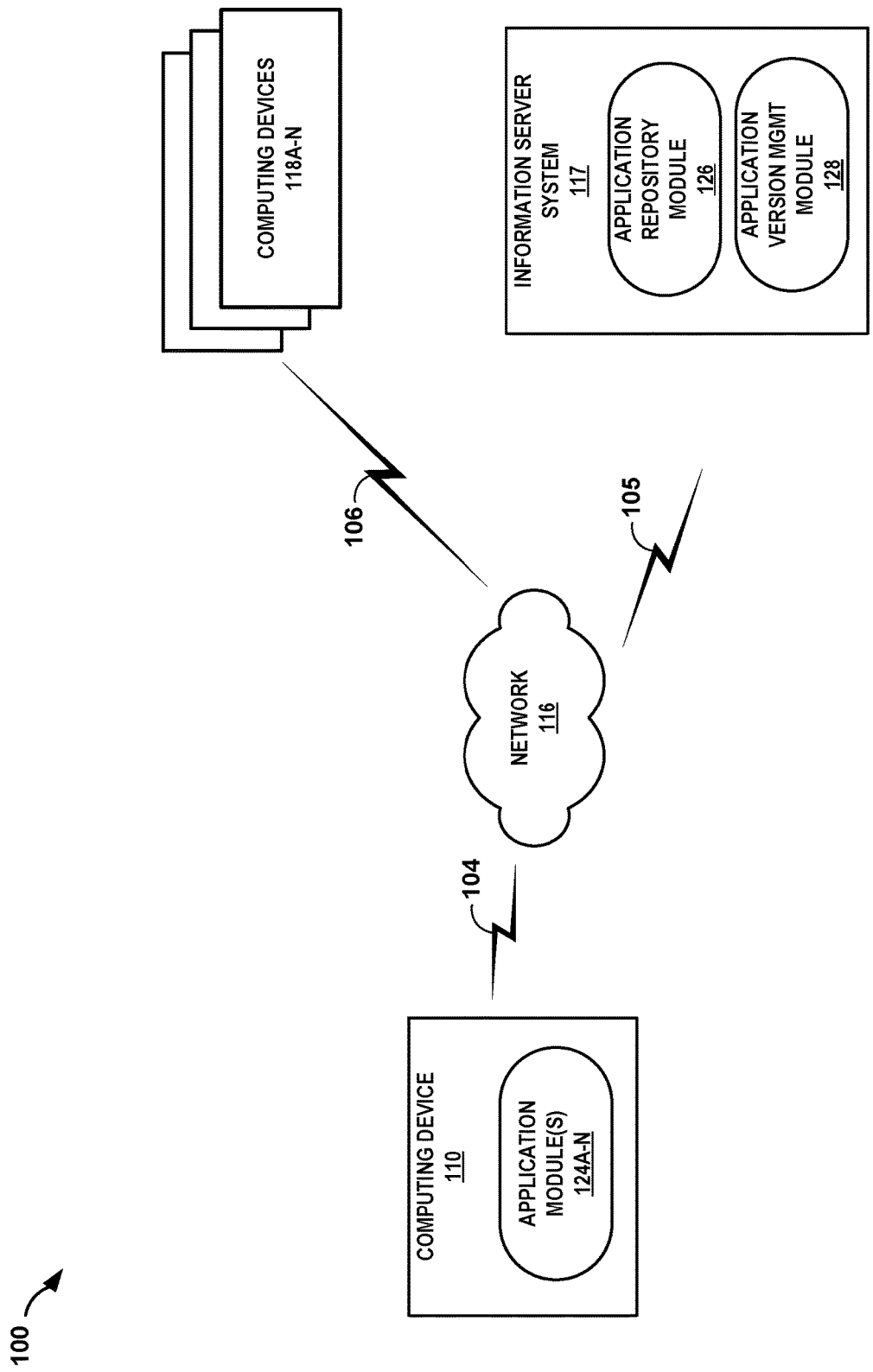
FIG. 1 is a conceptual diagram illustrating an example system configured to dynamically generate a test pool for staged rollouts of software applications, in accordance with one or more aspects of the present disclosure.

FIG. 1 is a conceptual diagram illustrating an example system configured to dynamically generate a test pool for staged rollouts of software applications, in accordance with one or more aspects of the present disclosure. System 100 may include computing device 110, information server system (ISS) 117, and a group of computing devices 118A-118N (collectively, "computing devices 118") that are communicatively coupled via network 116.

Each computing device of computing devices 118 may include a mobile or non-mobile computing device, such as a desktop computer, laptop, tablet, smartphone, computerized wearable device (e.g., a watch, eyewear, ring, necklace, etc.), speaker, television, automobile, or any other type of computing device configured to send and receive information via a network, such as network 116. Computing devices 118 may include one or more applications such as media applications (e.g., music, video, or the like), messaging applications (e.g., email, text, or the like), or any other type of application. Computing devices 118 may exchange information with computing device 110 and/or ISS 117 via network 116. For example, each computing device of computing devices 118 may send information to ISS 117 and may receive information from ISS 117.

Network 116 represents any public or private communications network, for instance, cellular, Wi-Fi, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and computing devices 118. Computing device 110, ISS 117, and computing devices 118 may transmit and receive data across network 116 using any suitable communication techniques. For example, ISS 117 may exchange data with computing device 110 via a cellular network and ISS 117 may exchange data with computing devices 118 via Wi-Fi®.

Computing device 110, ISS 117, and computing devices 118 may each be operatively coupled to network 116 using respective network links 104, 105, and 106. Computing device 110, ISS 117, and computing devices 118 may be operatively coupled to network 116 using a different network link. The links coupling computing device 110, ISS 117, and computing device 118 to network 116 may be Ethernet, ATM or other types of network connections, and such connections may be wireless and/or wired connections.

Computing device 110 may represent a mobile device, such as a smart phone, tablet computer, laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, vehicle cockpit displays, or any other types of wearable and non-wearable, mobile or non-mobile computing devices that may access a digital distribution platform for downloading executable software applications that execute at computing device 110.

Computing device 110 may include one or more application modules 124A-N (collectively, "application modules 124"). Application modules 124 represent various individual applications and services that may be executed at computing device 110. A user of computing device 110 may interact with an interface (e.g., a graphical user interface) associated with one or more application modules 124 to cause computing device 110 to perform a function. Numerous examples of application modules 124 may exist and include, a mapping or navigation application, a calendar application, a personal assistant or prediction engine, a search application, a transportation service application (e.g., a bus or train tracking application), a social media application, a game application, an e-mail application, a messaging application, an Internet browser application, or any and all other applications that may execute at computing device 110. In some examples, one or more of application modules 124 may be installed at computing device 110 during production, testing, or otherwise at the time computing device 110 is manufactured and prior to being delivered to a user (e.g., consumer). In some examples, one or more application modules 124 may be installed by a user of computing device 110 after delivery to the user. For example, computing device 110 may download and install one or more application modules 124 from an application repository service provided by ISS 117.

ISS 117 represents any suitable remote computing system, such as one or more desktop computers, laptop computers, mainframes, servers, cloud computing systems, etc. capable of sending and receiving information both to and from a network, such as network 116. ISS 117 may host applications and data for contextual information, music, weather information, traffic information, messaging information (e.g., email, text messages), calendar information, social media, news information, etc. ISS 117 may represent a cloud computing system that provides information through network 116 to computing device 110, which may output at least a portion of the information provided by ISS 117 to a user.

In some examples, ISS 117 includes application repository module 126. Application repository module 126 may host an application repository service and provide a digital distribution platform related to computing software and provide access to a plurality of applications and information associated with each respective application of the plurality of applications. For example, application repository module 126 may enable computing device 110 to present a user interface associated with application repository module 126 from which a user of computing device 110 may browse, search, select, purchase, or cause computing device 110 to download, install, and/or update one or more applications from application repository module 126. In some examples, application repository module 126 may include information about each application, such as a description of each application and/or user comments and reviews of each application. Application repository module 126 may send information about one or more applications of the plurality of applications to computing device 110 so that computing device 110 may display the information to a user of the computing device 110. In some examples, application repository module 126 may receive an updated version of a particular application module (e.g., application module 124A) from a developer of the particular application module and may make the updated version of the application available to users of application repository module 126.

ISS 117 may include an application version management module (AVMM) 128 that is configured to distribute updates of application modules 124 via multi-staged rollouts. AVMM 128 of ISS 117 may determine whether a particular computing device should receive an updated version of application modules 124 during a first stage of a multi-stage rollout by determining whether the particular computing device contributes additional test scope to the multi-stage rollout. That is, AVMM 128 may determine whether adding a particular computing device to a test pool of computing devices will likely increase the diversity of device characteristics and/or user characteristics associated with computing devices already included in the first stage of the multi-stage rollout. For example, ISS 117 may distribute an updated version of application module 124A to a group of computing devices 118 during a first stage of a multi-stage rollout of the update. AVMM 128 may determine whether computing device 110 contributes additional test scope for the updated version of application module 124A beyond the existing test scope that is already contributed by the group of computing devices 118. In other words, AVMM 128 may determine whether distributing the updated version of application module 124A to computing device 110 increases the probability that errors in application module 124A may be detected.

AVMM 128 may determine whether computing device 110 contributes additional test scope beyond the test scope provided by computing devices 118 based at least in part on one or more characteristics of computing device 110 and one or more characteristics of the group of computing devices 118 that exclude computing device 110. AVMM 128 may analyze information associated with computing device 110 and/or a user of computing device 110 if the user affirmatively consents to use or collection of such information. AVMM 128 may further provide opportunities for the user to withdraw consent and in which case, AVMM 128 may cease collecting or otherwise retaining the information associated with computing device 110 or the user of computing device 110.

AVMM 128 may determine one or more characteristics of computing device 110, such as characteristics of one or more hardware components of computing device 110, one or more firmware components of computing device 110, one or more software components of computing device 110, or a combination therein. In some examples, hardware components of a computing device may include a display unit (e.g., a touch-screen), volatile memory (e.g., random access memory (RAM)), non-volatile memory (e.g., a hard disk drive (HDD) or solid state drive (SSD)), one or more processors, one or more communication units (e.g., Bluetooth® and/or WiFi® radios), etc. The characteristics of one or more hardware components of a computing device may include a size of the display unit, an amount of RAM, an amount of non-volatile memory, a type of the one or more processors, etc. In some examples, software components may include an operating system and one or more applications executable at a computing device. The characteristics of one or more software components may include a version of an operating system executing at a computing device, a language setting of the operating system, a geographic region the OS is configured to operate in (e.g., a time-zone selected for the OS), whether an application related to an application is currently installed at computing device (e.g., application modules 124A and 124B may be related if application modules 124A and 124B are developed by the same person or company), the version of applications currently installed at a computing device, etc. In some examples, one or more firmware components (e.g., BIOS or Unified Extensible Firmware Interface (UEFI)) may include components that control a particular hardware component and the characteristics of the one or more firmware components may include a version of the instructions that control the particular hardware component associated with a particular firmware component.

AVMM 128 may request information about the hardware components, firmware components, and/or software components from computing device 110 in response to receiving a request from computing device 110 for information about applications housed in application repository module 126. Prior to providing an indication of applications in response to the request, AVMM 128 may determine a version of the operating system (OS) executing at computing device 110 in order to determine a set of applications that are compatible with the operating system.

AVMM 128 may determine whether computing device 110 contributes additional test scope by comparing the characteristics of the one or more hardware components of computing device 110 to the characteristics of corresponding hardware components of the computing devices in the group of computing devices 118. For example, AVMM 128 may determine a category of each component of computing device 110. For instance, AVMM 128 may categorize the amount of RAM in computing device 110 as "high" if computing device 110 includes at least 4.0 GB of RAM, "medium" if computing device 110 includes at least 2.0 GB of RAM but less than 4.0 GB of RAM, or "low" if computing device 110 includes less than 2.0 GB of RAM. Similarly, AVMM 128 may categorize the screen or display size of computing device 110 as "5.5+ inches" if the display of computing device 110 is at least 5.5 inches diagonal, "4.5 to 5.4 inches" if the display of computing device 110 is at least 4.5 inches diagonal but less than 5.5 inches diagonal, or "Less than 4.5 inches" if the display of computing device 110 is less than 4.5 inches diagonal. Likewise, AVMM 128 may compare the characteristics of the one or more software components of computing device 110 to the characteristics of corresponding software components of the computing devices in the group of computing devices 118.

AVMM 128 may determine whether the category of each component of computing device 110 matches a category of the corresponding component of each respective computing device in the group of computing devices 118. For example, AVMM 128 may compare the categories of each component (e.g., RAM, processor, and screen size) of computing device 110 to the categories of each corresponding component of each respective computing device in the group of computing devices. In other words, if AVMM 128 determines that computing device 110 includes a "high" amount of RAM, a "medium" processor, and a "large" screen size, AVMM 128 may determine whether any of computing device 118 also include a "high" amount of RAM, a "medium" processor, and a "large" screen size. In some examples, if at least one of computing devices 118 includes a "high" amount of RAM, a "medium" processor, and a "large" screen size, AVMM 128 may determine that computing device 118 does not contribute additional test scope.

AVMM 128 may determine that computing device 110 does not contribute additional test scope in response to determining that the category of one or more respective components of computing device 110 matches the category of the corresponding components of any computing device in the group of computing devices 118. Stated another way, AVMM 128 may determine whether any of computing devices 118 are similar to computing device 110 to determine whether computing device 110 contributes additional test scope. AVMM 128 may determine that computing device 110 is similar to one or more computing devices in the group of computing devices 118 when the category of one or more components of a computing device 118 matches the category of the corresponding component of computing device 110. In some instances, AVMM 128 determines that computing device 110 is similar to a computing device in the group of computing devices 118 if the category of each component of computing device 110 matches the category of the corresponding component of a computing device 118.

AVMM 128 may determine, for each computing device in the group of computing devices 118, that the category of at least one component of computing device 110 does not match the category of the corresponding component of the respective computing device in the group of computing device 118. For instance, in a simplified example where the group of computing devices 118 includes two computing devices 118, AVMM 128 may determine that a first computing device of computing devices 118 includes a "high" amount of RAM, a "medium" processor, and a "medium" screen size. Similarly, AVMM 128 may determine that the second computing device of computing device 118 includes a "medium" processor, a "large" screen size, and a "low" amount of RAM. In these examples, AVMM 128 may determine, for each computing device in the group of computing devices 118, that the category of at least one component of computing device 110 does not match the category of the corresponding component of each respective computing device 118. In other words, AVMM 128 may determine that computing device 110 is not similar to any particular computing device in the group of computing devices 118. Thus, in some examples, AVMM 128 may determine that computing device 110 contributes additional test scope beyond the existing test scope provided by the group of computing devices 118 that already include the updated version of application module 124A.

AVMM 128 may determine whether a computing device contributes additional test scope for an updated version of an application based at least in part on one or more characteristics of a user of the computing device. For example, computing device 110 may include one or more user profiles and a particular user profile may be active at any given time. The active user profile may be associated with information for one or more characteristics of the current user of computing device 110, such as the user's age, gender, geographic location (e.g., a user's home country or state), tendency to use certain (e.g., new) features of an application, or other information about the user. In some examples, AVMM 128 may determine that computing device 110 contributes additional test scope by comparing the characteristic of the active user profile to a corresponding characteristic of the users associated with the group of computing devices. For example, AVMM 128 may determine that computing device 110 contributes additional test scope if the active user profile of computing device 110 indicates the user lives in England and fewer than a threshold number of users of computing devices 118 also live in England.

In some examples, AVMM 128 determines whether a computing device contributes additional test scope by determining a contribution score indicative of the probability that the computing device increases the probability of detecting errors in the updated version of the application and comparing the contribution score for the computing device to a threshold contribution score. For example, AVMM 128 may determine the contribution score for computing device 110 based on determining whether computing device 110 is similar to any of computing devices 118. For example, AVMM 128 may determine a contribution score based on one or more characteristics of computing device 110 and/or the characteristics of a user of computing device 110. For example, AVMM 128 may assign a high (e.g., 95 on a scale of 0-100) contribution score to computing device 110 if none of computing devices 118 include characteristics that are similar to each the characteristics of computing device 110 (e.g., none of computing devices 118 include a "high" amount of RAM, a "medium" processor, and a "large" screen size).

In some instances, AVMM 128 may determine that computing device 110 contributes additional test scope even if the category of each component of computing device 110 matches a respective category of the components of another computing device in the group of computing devices 118. For example, even if computing device 110 and one of computing devices 118 each include a "high" amount of RAM, a "medium" processor, and a "large" screen size, AVMM 128 may determine that computing device 110 contributes additional test scope to increase the statistical probability that an error in the application that affects a particular characteristic or combination of characteristics will be detected. For instance, AVMM 128 may determine a quantity (e.g., number, percentage of total, etc.) of computing devices in the group of computing devices 118 that are similar to computing device 110 and may determine that computing device 110 contributes additional test scope if the quantity of similar computing devices in the group of computing devices 118 is less than or equal to a threshold quantity of devices.

Responsive to determining that computing device 110 contributes additional test scope beyond the existing test scope provided by the group of computing devices 118, AVMM 128 may add computing device 110 to the group of computing devices. In other words, AVMM 128 may determine that computing device 110 is eligible to receive the updated version of application 124A and may provide the updated version of application module 124A for installation at computing device 110. For example, AVMM 128 may send the updated version of application module 124A to computing device 110 automatically (e.g., without a user command to install the updated version of application module 124A if a user of computing device 110 previously enabled automatic updates) or in response to receiving a user input to install the updated version of application module 124A.

The techniques of the disclosure may enable a computing system to dynamically generate test pools for staged rollouts of software applications and increase the probability of detecting errors in an updated application. Undetected errors may cause some computing devices to malfunction, operate in unintended ways, or otherwise negatively affect a user experience (e.g., unexpectedly close, unintentionally drain battery power, slow response times, inconsistent scrolling speeds, low framerates, etc.) when an updated application is executed by a computing device. Certain errors may affect a subset of computing devices which may not be represented by the devices in the test pool when the test pool is generated on first-come, first served basis, a random basis, or only includes devices with a pre-determined set of characteristics.

The techniques of this disclosure may enable a computing system to determine whether the characteristics of a computing device and/or the characteristics of a user of the computing device are likely to increase the probability of detecting errors in the updated version of the application during a first stage of a multi-stage rollout. In other words, the computing system may determine whether a particular computing device contributes additional test scope for the updated version of the application during a first stage of a multi-stage rollout and, if so, adding the device to the test pool and providing the updated version of the application to the particular computing device. By selectively adding devices to the test pool, the techniques of this disclosure may increase the diversity of user characteristics and/or device characteristics tested during the first stage of a multi-stage application rollout while potentially reducing the number of user and devices participating in the first stage of the multi-stage rollout. In other words, selectively adding devices to the test pool may result in a test pool that includes a broader combination of devices and users being used to test the updated version of the application. Broadening the combination of devices or users testing the updated version of the application, may increase the probability that specific errors in the updated version of the application are detected before distributing the updated version of the application to a wider population of devices and/or users in a later, second stage of the multi-stage rollout. Thus, increasing the diversity of the test pool may provide more robust statistical probability of detecting errors and minimize the number of devices and users that may be negatively affected by errors in the updated version of the application. Detecting errors in the first stage of the application rollout may enable an application developer to fix the errors prior to the second stage of the multi-stage rollout, thus potentially reducing negative effects in performance of computing devices with the updated version of the application and negative effects in the user experience. In some examples, the application developer may detect and fix errors in the first stage of the rollout, such that the computing system may restart the first stage of the multi-stage rollout (e.g. by providing another updated version of the application to the devices in the test pool) and determining whether additional candidate computing devices should be added to the test pool.

Figure 2:
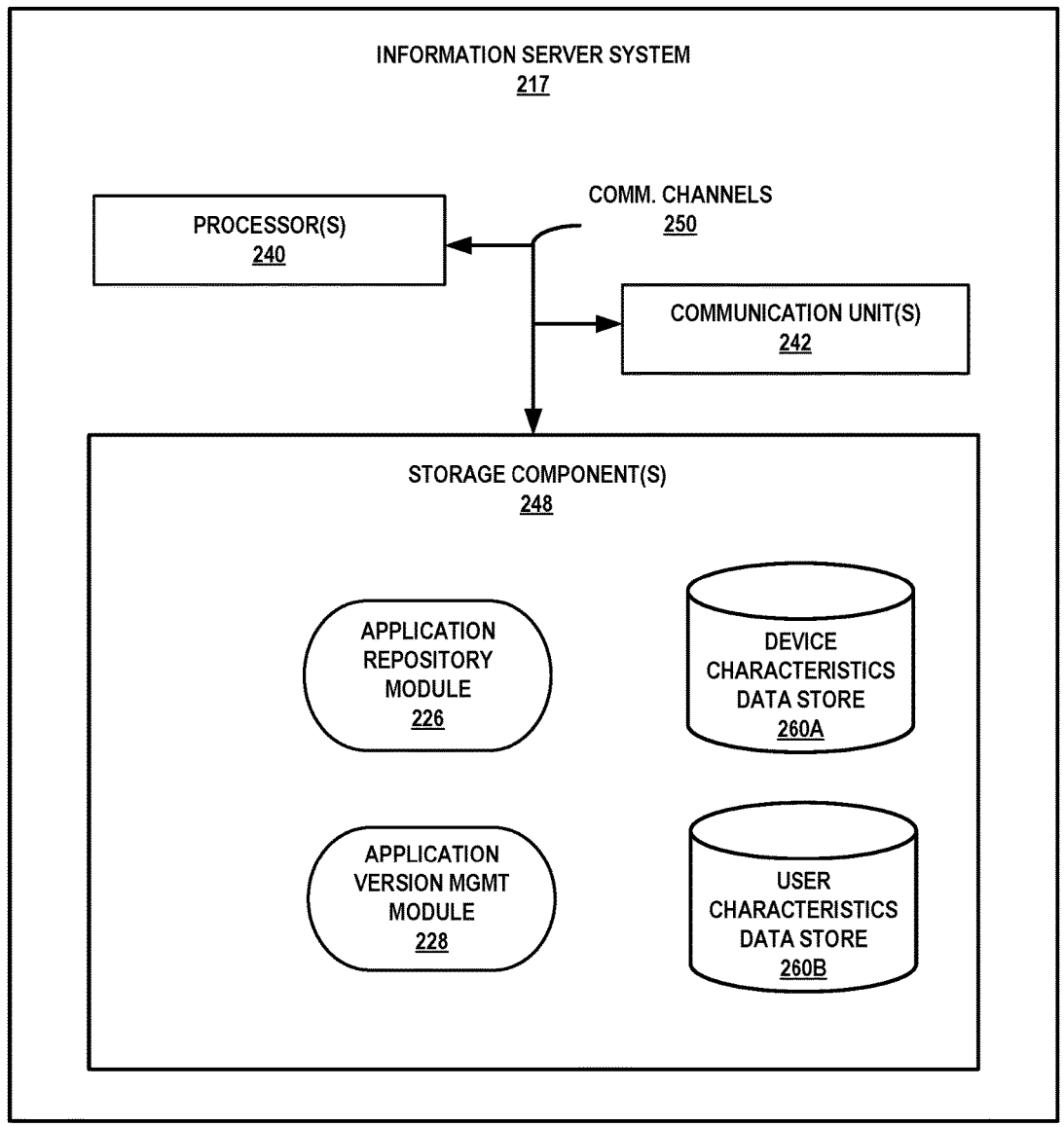
FIG. 2 is a block diagram illustrating an example computing device configured to dynamically generate a test pool for staged rollouts of software applications, in accordance with one or more aspects of the present disclosure.

FIG. 2 is a block diagram illustrating an example computing device, such as an ISS, configured to dynamically generate a test pool for staged rollouts of software applications, in accordance with one or more aspects of the present disclosure. ISS 217 of FIG. 2 is described below as an example of ISS 117 illustrated in FIG. 1. FIG. 2 illustrates only one particular example of ISS 217, and many other examples of ISS 217 may be used in other instances and may include a subset of the components included in example ISS 217 or may include additional components not shown in FIG. 2. FIG. 2 is described in the context of system 100 of FIG. 1.

As shown in the example of FIG. 2, ISS 217 includes one or more processors 240, one or more communication units 242, and one or more storage components 248. Storage components 248 may include application repository module 226 and AVMM 228. Additionally, storage components 248 are configured to store device characteristics data store 260A and user characteristics data store 260B (collectively, "data stores 260"). Communication channels 250 may interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more communication units 242 of ISS 217 may communicate with external devices (e.g., computing device 110 of FIG. 1) via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more processors 240 may implement functionality and/or execute instructions associated with ISS 217. Examples of processors 240 include application processors, display controllers, auxiliary processors, one or more sensor hubs, and any other hardware configure to function as a processor, a processing unit, or a processing device. Modules 226 and 228 may be operable by processors 240 to perform various actions, operations, or functions of ISS 217. For example, processors 240 of ISS 217 may retrieve and execute instructions stored by storage components 248 that cause processors 240 to perform the operations of modules 226 and 228. The instructions, when executed by processors 240, may cause ISS 217 to store information within storage components 248.

One or more storage components 248 within ISS 217 may store information for processing during operation of ISS 217 (e.g., ISS 217 may store data accessed by modules 226 and 228 during execution at ISS 217). In some examples, storage component 248 is a temporary memory, meaning that a primary purpose of storage component 248 is not long-term storage. Storage components 248 on ISS 217 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 226 and 228, as well as data stores 260. Storage components 248 may include a memory configured to store data or other information associated with modules 226 and 228, as well as data stores 260.

Storage components 248 may include an application repository module 226. Application repository module 226 may be an example of, and provide the functionality of, application repository module 126 of FIG. 1. For example, application repository module 226 may provide a digital distribution platform related to computing software and may provide access to a plurality of applications that may be downloaded from ISS 217 to an external computing device (e.g., computing device 110 of FIG. 1). For instance, an external computing device may display a graphical user interface representative of application repository module 226 and may receive a user input that causes the external computing device to install the particular application.

Application repository module 226 of ISS 217 may host a plurality of applications. In some examples, application repository module 226 includes multiple versions of an application. For example, application repository module 226 may receive an updated version of an application and may maintain an earlier version of the application even after receiving the updated version of the application. For instance, AVMM 228 may distribute the updated version of the application to a limited group of computing devices during a first stage of a multi-stage rollout. AVMM 228 may distribute the earlier version of the application to all other computing devices that access the application repository module until AVMM 228 begins the second stage of the rollout for the updated version of the application.

In some examples, AVMM 228 determines whether a particular candidate computing device should receive the updated version of the application during the initial, first stage of the rollout of the update application, or during a subsequent, second stage of the rollout. AVMM 228 may determine whether the candidate computing device should receive the updated version of the application during the first stage of the rollout by determining whether the candidate computing device is likely to increase the diversity of device characteristics and/or user characteristics associated with computing devices already in the test pool. In other words, AVMM 228 may determine whether the candidate computing device includes characteristics that increase the probability that certain errors in the updated version of the application will be detected in order to determine whether the candidate computing device should receive the updated version of the application.

For example, AVMM 228 may determine whether the candidate computing device (e.g., computing device 110 of FIG. 1) is likely to increase the diversity of the test pool by determining whether the candidate computing device contributes additional test scope for the updated version of the application beyond the test scope already contributed by the group of computing devices in the test pool (e.g., computing devices 118 of FIG. 1). In other words, AVMM 228 may determine whether the candidate computing device is likely to increase the test scope of the updated version of the application to determine whether the candidate computing device should receive the updated version of the application during the first stage of a multi-stage rollout.

AVMM 228 may determine whether the candidate computing device contributes additional test scope based at least in part on one or more characteristics of the candidate computing device. In other words, AVMM 228 may compare the characteristics of the candidate computing device and/or characteristics of a user of the candidate computing device to characteristics of devices and/or users already in the test pool to determine whether the candidate computing device is likely to increase the probability of detecting errors in the updated version of the application. AVMM 228 may analyze information associated with computing devices and/or users of computing devices if the respective user of the computing device affirmatively consents to use or collection of such information. AVMM 228 may further provide opportunities for the user to withdraw consent and in which case, AVMM 228 may cease collecting or otherwise retaining the information associated with the computing device or the user of the computing device.

AVMM 228 may determine one or more characteristics of the candidate computing device (e.g., information about the hardware components, firmware components, and/or software components of computing device 110) and compare to the characteristics of the devices in the test pool to determine whether the candidate computing device contributes additional test scope for the updated version of the application. As described above with respect to FIG. 1, the characteristics of hardware components may include a size of a display unit, amount of volatile memory (e.g., RAM), amount of non-volatile memory, type of processor etc. Similarly, the characteristics of software components may include a OS version, a language setting of the OS or application, etc. In some examples, the characteristics of the firmware components may include a version of a particular firmware component. AVMM 228 may determine one or more characteristics of the candidate computing device by requesting information about the hardware, software, and/or firmware components from the candidate computing device.

In some examples, AVMM 228 determines a category of each component of the candidate computing device and uses the category to determine whether a candidate computing device contributes additional test scope. In determining a category, AVMM 228 may categorize or classify each component into a particular category for a given component type. For example, AVMM 228 may categorize one or more hardware, firmware, and/or software components as one of "good", "better", or "best"; one of "high", "medium", or "low"; or any other alphanumeric (e.g., textual or numeric) classification scheme. For instance, AVMM 228 may categorize the amount of RAM in the candidate computing device as "high" if the computing device includes at least 4.0 GB of RAM, "medium" if the computing device includes at least 2.0 GB of RAM but less than 4.0 GB of RAM, or "low" if the computing device includes less than 2.0 GB of RAM.

In some examples, AVMM 228 determines whether the candidate computing device contributes additional test scope for the updated version of the application by comparing one or more components (e.g., hardware, software, or firmware components) of the candidate computing device to the group of computing devices already in the test pool to determine whether the candidate computing device is similar to one or more computing devices that are already in the test pool. AVMM may determine whether the candidate computing device is similar to any of computing devices in the test pool by determining whether a category of one or more components of the candidate computing device matches the category of the corresponding component of a computing device in the test pool. For instance, responsive to categorizing one or more components of the candidate computing device into respective categories, AVMM 228 may query device characteristics data store 260A and/or user characteristics data store 260B to compare one or more components of the candidate computing device to each computing device in the group of computing devices that are already in the test pool.

Device characteristics data store 260A may include one or more sorted databases (e.g., hash tables, linked lists, sorted arrays, graphs, etc.) that specify one or more applications within application repository module 226, version information for each of the one or more applications, and information about the device characteristics of the computing devices that include a particular version of an application. In other words, device characteristics data store 260A may specify the characteristics of each device in the test pool that include a particular (e.g., updated) version of an application. Similarly, user characteristics data store 260B may include one or more sorted databases that specify user information about the users of the computing devices that include a particular version of the application.

AVMM 228 may determine that the candidate computing device is similar to at least one of computing devices already in the test pool in response to determining that the category of one or more components of the candidate computing device matches the category of a corresponding component of a device in the test pool. In some examples, AVMM 228 may determine that the candidate computing device is similar to one of the computing devices already in the test pool if the category of each component of the candidate computing device matches the category of the corresponding component of a particular computing device in the test pool.

For example, AVMM 228 may determine that a candidate computing device is not similar to any of the computing devices already in the test pool in response to determining that the category of at least one component of the candidate computing device does not match the category of a corresponding component of a computing device already in the test pool. In other words, if the candidate computing device includes a "medium" amount of RAM, a "medium" amount of non-volatile storage, a "low" screen size, and an OS version 7, AVMM 228 may determine that the candidate computing device is not similar to any devices already in the test pool if none of the computing devices that are already in the test pool include a "medium" amount of RAM, a "medium" amount of non-volatile storage, a "low" screen size, and an OS version 7. In contrast, AVMM 228 may determine that another candidate computing device is similar to a device that is already in the test pool in response to determining that the category of each component of the other candidate device matches the category of the corresponding component of a computing device that is already in the pool. In other words, if the second candidate computing device includes a "high" amount of RAM, a "high" amount of non-volatile storage, a "high" screen size, and an OS version 6, and some other device that is already in the test pool also includes a "high" amount of RAM, a "high" amount of non-volatile storage, a "high" screen size, and an OS version 6, AVMM 228 may determine that the second candidate device does not contribute additional test scope.

In some examples, AVMM 228 determines whether a candidate computing device contributes additional test scope based at least in part on information associated with a user of the candidate computing device. For instance, AVMM 228 may categorize information about the user of computing device into categories for given user characteristic. For example, AVMM 228 may request information associated with the current user profile (e.g., age, gender, language, application usage history, geographic location, etc.) and may categorize each of the characteristics of the user. For instance, AVMM 228 may categorize a user's language as "English", "Spanish", "German", "Mandarin", or another language indicated by the current user profile. As another example, AVMM 228 may categorize the user's application usage history of a particular application "daily", "weekly", "monthly", or "other". In another example, AVMM 228 may characterize the user's geographic location as "US", "GB", "JP", or other any other country or geographic region (e.g., city, state, etc.).

Responsive to determining a category for one or more user characteristics, AVMM 228 may compare the category of one or more user characteristics to the category of a corresponding user characteristic of the users associated with the group of computing devices already in the test pool. For instance, AVMM 228 may determine that the location setting of the active user profile of a particular candidate computing device is set to the United States and the location setting is set to "English" and that the candidate computing device is not similar to any of the existing computing devices in the test pool because none of the devices in the test pool are also associated with a user located in the United States and a language setting of "English". In contrast, AVMM 228 may determine that a different candidate computing device is similar to a computing device that is already in the pool if the different candidate computing device and at least one of the devices in the pool are both associated with users located in Great Britain and a location setting of "English."

In some examples, AVMM 228 determines that a candidate computing device contributes additional test scope beyond the existing test scope provided by the group of computing devices in the test pool in response to determining that the candidate computing devices is similar to a threshold quantity of computing devices. In some instances, the threshold quantity of devices equals one device. In other words, AVMM 228 may determine that a candidate computing device does not contribute additional test scope if any of the devices in the test pool are similar to the candidate computing device. In some instances, the threshold quantity of devices is a number greater than one (e.g., the threshold number of devices may be equal to 10, 20, 30, etc.). For instance, the threshold quantity of devices may equal a quantity that increases the statistical probability of detecting an error in the updated version of the application. AVMM 228 may determine that the candidate computing devices contributes additional test scope in response to determining that the candidate computing devices is similar to no more than a threshold quantity of devices already in the test pool.

AVMM 228 may determine whether a candidate computing device contributes additional test scope for the updated version of the application by determining a contribution score indicative of the probability that the characteristics of the candidate computing device and/or the characteristics of the user of the candidate computing device increase the probability of detecting errors in the updated version of the application and comparing the contribution score to a threshold contribution score. AVMM 228 may determine the contribution score based on a set of rules that utilize various inputs to generate a score. The rules may be preprogrammed, or may be generated by AVMM 228 using machine learning. In some examples, AVMM 228 determines the contribution score based at least in part on a category of each component of the candidate computing device and the quantity of computing devices in the test pool of computing devices that include a component in the same category as the corresponding component of computing device 118. In other words, if AVMM 228 determines that RAM component of the candidate computing device falls into the category "high," AVMM 228 may determine the contribution score for the candidate computing device based on the number of computing devices in the test pool that also include a "high" amount of RAM. For instance, AVMM 228 may determine that the RAM component of the candidate computing device contributes to a larger contribution score if a small quantity (e.g., number or percentage) of computing devices in the test pool also have a "high" amount of RAM, but that the RAM component contributes relatively little to the contribution score as the quantity of computing devices in the test pool with a "high" amount of RAM increases.

In some examples, AVMM 228 may adjust (e.g., increase) the contribution score for the candidate computing device in response to determining that the quantity of computing devices in the test pool that include a component in the same category as the component of the candidate of the computing devices does not satisfy (e.g., is less than) the threshold quantity of computing devices. Said another way, as one example, if the candidate computing device includes a "high" amount of RAM and the quantity of computing devices in the test pool that includes a "high" amount of RAM is less than the threshold quantity of computing devices, AVMM 228 may increase the contribution score for the candidate computing device.

AVMM 228 may determine the contribution score based on the information associated with the active user profile of the candidate computing device. For instance, AVMM 228 may determine the contribution score by comparing one or more user characteristics to the characteristics of the users of the computing devices already in the test pool. For example, if the language settings associated with the active user profile is set to "German" and relatively few user profiles associated with devices already in the test pool are set to the same language setting, AVMM 228 may assign a relatively high contribution score to the candidate computing device. In contrast, AVMM 228 may assign a relatively low contribution score to the candidate computing device as the quantity computing devices that are already in the test pool and are associated with user profiles set the same language setting increases.

In some instances, AVMM 228 determines the contribution score based on information associated with the active user profile, such as application usage history. For instance, AVMM 228 may determine that the application usage history information for the active user profile indicates the user does not use the application very often (e.g., AVMM 228 may characterize the usage as "monthly") or uses relatively few features of the application, which may indicate the current active user is less likely to discover errors in the updated version of the application. Thus, AVMM 228 may assign a lower contribution score to the candidate computing device based on the application usage history for the current active user of the candidate computing device. In contrast, if AVMM 228 determines that the current active user utilizes the application often and/or uses many features of the application, AVMM 228 may assign a higher contribution score for the candidate computing device.

AVMM 228 may determine whether the candidate computing device contributes additional test scope beyond the existing test scope provided by the group of computing devices in the test pool by determining whether the contribution score for the candidate computing device satisfies (e.g., is greater than or equal to) a threshold contribution score. In other words, because the contribution score for the candidate computing device may indicate the probability that the characteristics of the user and/or candidate computing device increase the probability of detecting errors in the updated version of the application, a contribution score that satisfies the threshold may indicate that the characteristics of the user and/or computing device increases the probability of detecting errors in the updated version of the application. In some scenarios, AVMM 228 determines that the candidate computing device contributes additional test scope for the updated version of the application in response to determining that the contribution score for the candidate computing device satisfies (e.g., is greater than or equal to) a threshold contribution score.

The threshold contribution score may be static or variable. In some instances, AVMM 228 may determine the threshold contribution score based on the number of computing device in the group of computing devices that make up the test pool. For instance, when the test pool is small, AVMM 228 may set the threshold contribution score to a relatively low (e.g., 20 out of 100) value. In these instances, AVMM 228 may increase the threshold contribution score as the number of computing devices in test pool increases. By starting with a low threshold contribution score when the test pool is smaller and increasing the threshold contribution score as the test pool increases, AVMM 228 may add devices to the test pool quickly early on during the first stage of the multi-stage rollout and add devices that are more likely to increase the diversity of the test pool in later parts of first stage.

AVMM 228 may determine the threshold contribution score based on a random number generator. In some examples, AVMM may set the threshold contribution score to a first, arbitrarily generated value (e.g., between 0 and 100) for a first candidate computing device and a set the threshold contribution score to a second arbitrarily generated value for a second computing device. AVMM 228 may determine that a candidate computing device contributes additional test scope in response to determining that the contribution score for the candidate computing device satisfies (e.g., is greater than or equal to) the threshold contribution score. Because AVMM 228 may set the threshold contribution score to an arbitrary value, in some examples, AVMM 228 may determine that a first candidate computing device with a large (e.g., 90 out of 100) contribution score may not contribute additional test scope even though AVMM 228 may determine that a second candidate computing device with a lower (e.g., 20 out of 100) contribution score does contribute additional test scope. Arbitrarily assigning a threshold contribution score may increase the statistical significance of the test pool (e.g., by potentially reducing the effect of biases in the algorithm that determines the contribution score).

In some examples, responsive to determining that the candidate computing device does not contribute additional test scope for the updated version of the application, AVMM 228 may refrain from providing the updated version of the application to the candidate computing device. For example, if the candidate computing device requests information about the application from application repository module 226 of ISS 217, ISS 217 may send information about an earlier version of the application to the candidate computing device. ISS 217 may refrain from sending information about the updated version of the application until the first stage of the multi-stage rollout is complete and a second stage of the rollout begins.

Responsive to determining that the candidate computing device contributes additional test scope for the updated version of the application beyond the existing test scope provided by the group of computing devices in the test pool, AVMM 228 may add the candidate computing device to the test pool and may provide the updated version of the application for installation at the candidate computing device. In some examples, AVMM 228 may send a notification to the candidate computing device indicating that the updated version of the application is available for installation. In such examples, the candidate computing device may receive a user input to install the updated version of the application and may request the updated version of the application from application repository module 226 of ISS 217. Responsive to receiving the request for the updated version of the application from the candidate computing device, ISS 217 may send the updated version of the application to the candidate computing device. In some examples, ISS 217 may automatically send the updated version of the application to the candidate computing device (e.g., if the user of the candidate computing device has requested automatic updates).

FIG. 3 is a conceptual diagram illustrating example details of data structures used to store information for dynamically generating a test pool for a staged rollout of a software application, in accordance with one or more aspects of the present disclosure. For ease of illustration only, a first data structure will be described as candidate device data table 300 and a second data structure will be described as a test pool data table 302. However, the candidate device data and test pool data may be stored in any type of data structure.

Candidate device data table 300 may store information about one or more candidate computing devices (e.g., computing device 110 of FIG. 1) and/or information about respective users of the one or more candidate computing devices. Similarly, test pool data table 302 may store information about components (e.g., hardware, firmware, and/or software component) of the computing devices in a test pool and/or information about the users associated with the devices in the test pool. ISS 117 may analyze information associated with a computing device (e.g., computing device 110 and the group of computing devices 118) if a user of the computing device affirmatively consents to use or collection of such information. ISS 117 may further provide opportunities for the user to withdraw consent and in which case, ISS 117 may cease collecting or otherwise retaining the information associated with the particular computing device or the user of computing device.

In some examples, candidate device data table 300 includes columns Candidate Device ID 304, RAM Actual 306A RAM Category 306B, Storage Actual 308A, Storage Category 308B, Screen Size Actual 310A, Screen Size Category 310B, OS Version Actual 312A, OS Version Category 312B, User Country 314, and User Language 316. Candidate device data table 300 may include additional or fewer columns.

Column Candidate Device ID 304 may specify a device identifier for each candidate computing device. Column RAM Actual 306A may specify the amount of RAM for a particular computing device and column RAM Category 306B may specify a category for the RAM component of the particular computing device. Column Storage Actual 308A may specify the amount on non-volatile memory for the computing device and column Storage Category 308B may specify a category for the amount of non-volatile memory. Similarly, columns Screen Size Actual 310A and Screen Size Category 310B may respectively specify the size of a display unit and a category for the size of the display unit for the computing device. Columns OS Version Actual 312A and OS Version Category 312B may respectively specify the specific version number and the category of the OS version for the computing device. Column Country 314 may indicate the country specified by the user profile associated with a particular computing device and column Language 316 may indicate the language setting specified by the user profile associated with the particular computing device.

Test pool data table 302 may include columns Test Pool ID 305, RAM Actual 306A RAM Category 306B, Storage Actual 308A, Storage Category 308B, Screen Size Actual 310A, Screen Size Category 310B, OS Version Actual 312A, OS Version Category 312B, User Country 314, and User Language 316. Test pool data table 302 may include additional or fewer columns. Column Test Pool ID 305 may specify an identifier for each computing device in the test pool. The additional columns of test pool data table 302 may include information similar to the information described above with reference to the candidate device data table 300.

In some examples, AVMM 228 determines whether a candidate computing device contributes additional test scope for the updated version of the application by comparing one or more components (e.g., hardware, software, or firmware components) of the computing device to the group of computing devices already in the test pool to determine whether the candidate computing device is similar to one or more computing devices in the test pool. AVMM 228 may determine whether a candidate computing device is similar to any of computing devices in the test pool based on the actual (e.g., uncategorized) component characteristics of the computing device or based on a category of the components of the computing device. In some instances, AVMM 228 may determine whether the component characteristics (e.g., 2 GB RAM, 32 GB Storage, 4.6" Screen Size, etc.) of candidate computing device A match the component characteristics any of devices A-N of the test pool. In some instances, AVMM 228 may determine whether the category of a component (e.g., "medium" RAM, "medium" Storage, etc.) of candidate computing device A matches the category of the corresponding component of any of devices A-N in the test pool.

AVMM 228 may determine that a candidate computing device is similar to at least one of the computing devices already in the test pool in response to determining that the category (or actual characteristics) of one or more components of the candidate computing device matches the category (or actual characteristics) of a corresponding component of a device in the test pool. For example, AVMM 228 may query test pool data table 302 and determine that candidate computing device A is not similar to any of the computing devices already in the test pool because the category of at least component of the candidate computing device A does not match the category of a corresponding component of a computing device already in the test pool. In other words, none of the computing devices A-N that are already in the test pool include a "medium" amount of RAM, a "medium" amount of non-volatile storage, a "low" screen size, and an OS version 7. Thus, in some examples, AVMM 228 may determine that candidate device A contributes additional test scope for a particular application. In contrast, AVMM 228 may determine that candidate computing device B is similar to computing device B in the test pool because the category of each component matches that category of the corresponding component of existing computing device B. In other words, candidate device B and existing test computing device D both include a "high" amount of RAM, a "high" amount of non-volatile storage, a "high" screen size, and an OS version 6. Thus, in some examples, AVMM 228 may determine that candidate computing device B does not contribute additional test scope for the particular application.

In some examples, AVMM 228 may determine whether a candidate computing device contributes additional test scope for the updated version of the application by calculating a contribution score the for candidate computing device. For example, AVMM 228 may determine a category for a particular characteristic (e.g., hardware, firmware, software, or user characteristic) and determine how many computing devices in the test pool include a characteristic of the same category as the category of the corresponding characteristic of candidate computing device A. In other words, AVMM 228 may determine how many devices in the test pool have a component or user characteristic that is similar to a component or user characteristic of the candidate computing device.

In some examples, AVMM 228 may determine a characteristic contribution score for each characteristic and may sum the individual characteristic contribution scores to determine an overall contribution score for the candidate computing device. For example, AVMM 228 may determine that the amount of RAM of candidate device A falls in the "medium" RAM category and may query test pool data table 302 to determine how many devices in the test pool also include a "medium" amount of RAM. For instance, AVMM 228 may determine that the RAM characteristic contribution score for candidate device A is relatively large (e.g., 9 out of 10) if the quantity of devices in the test pool with a "medium" amount of RAM is low and that the RAM characteristic contribution score for candidate device B is relatively small (e.g., 2 out of 10) if the quantity of devices in the test poll with a "high" amount of RAM is high. In other words, in some examples, a particular characteristic may contribute to the overall contribution score for candidate computing device A on a sliding scale depending on the quantity of devices in the test pool that include a similar characteristic.

AVMM 228 may determine whether the quantity of devices in the test pool that include a similar characteristic as the candidate computing device satisfies a threshold quantity of devices. In one scenario, AVMM 228 may determine that the test pool includes ten devices where the category for the RAM component matches the category of the RAM component of candidate computing device A. In such scenarios, if the threshold quantity of computing devices equals 30, AVMM 228 may determine that the RAM component of candidate computing device A contributes additional test scope and may increase the contribution score for candidate computing device A. For instance, AVMM 228 may set the RAM characteristic contribution score equal to 10 (e.g., out of 10). In one example, AVMM 228 may determine that a language setting for a user profile of candidate computing device A is set to English. AVMM 228 may query test pool data table 302 to determine how many devices in the test pool are associated with a user profile that include a language setting set to English. In some examples, AVMM 228 may determine that the test pool includes 35 devices with where the user's language setting is set to English, and determine that the quantity of devices in the test pool with a matching language setting does not satisfy (e.g., is less than) the threshold quantity of computing devices. In these scenarios, AVMM 228 may determine that the language settings user characteristic of candidate computing device A does not contribute additional test scope. In other words, AVMM 228 may set the language settings contribution score equal to zero. In some examples, AVMM 228 sums characteristic contribution scores for each of the characteristics to generate an overall contribution score for the candidate computing device.

AVMM 228 may compare the overall contribution score for a candidate computing device to a threshold contribution score. Responsive to determining that the overall candidate score satisfies (e.g., is greater than or equal to) the threshold contribution score, AVMM 228 may determine that the candidate computing device contributes additional test scope for the updated version of the application. Responsive to determining that the candidate computing device contributes additional test scope, AVMM 228 may add the candidate computing device to the test pool. Similarly, AVMM 228 may send the updated version of the application to the candidate computing device (e.g., automatically or in response to a user input) in response to determining that the candidate computing device contributes additional test scope for the updated version of the application.

Figure 4:
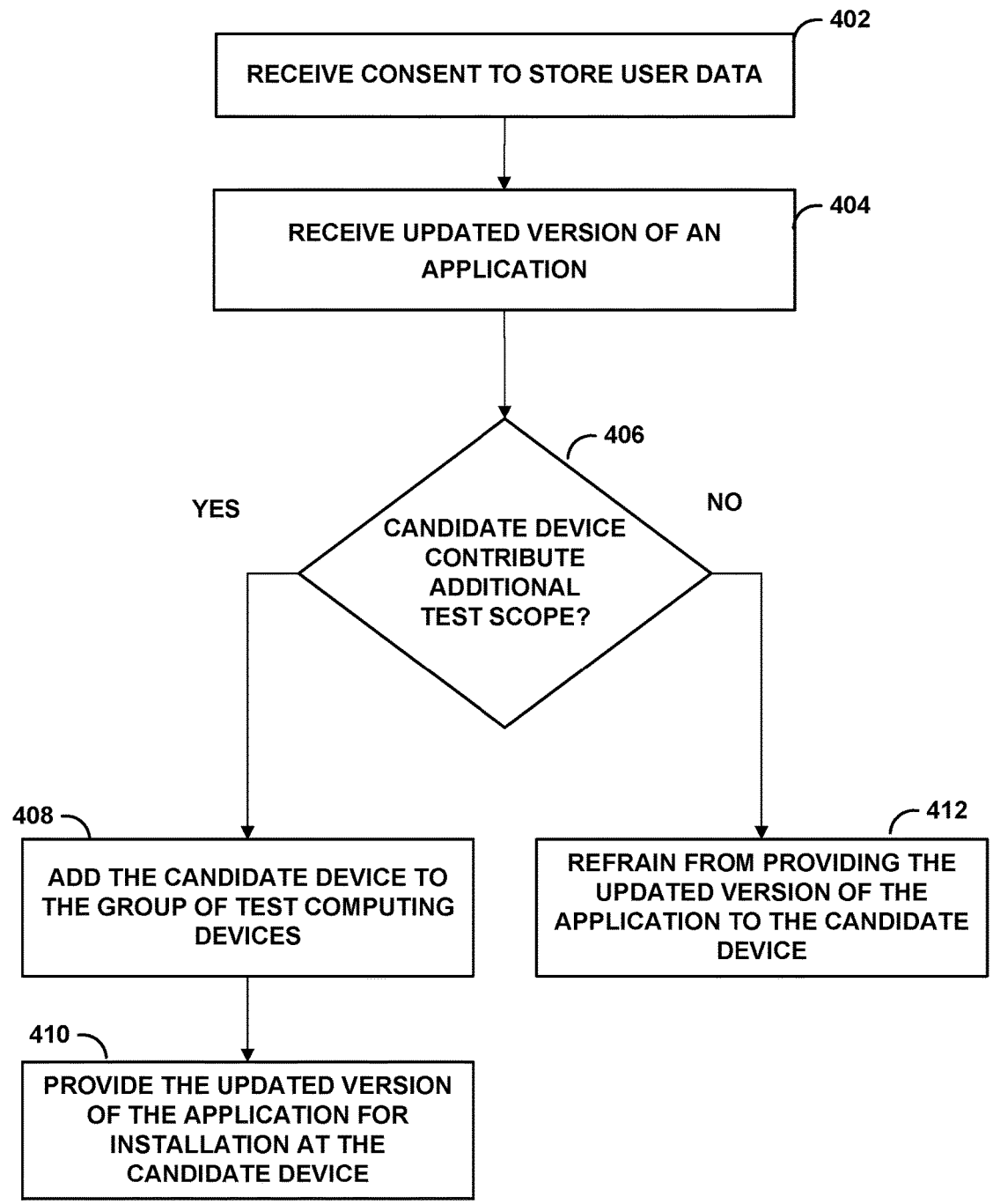
FIG. 4 is a flowchart illustrating example operations of a computing system configured to dynamically generate a test pool for staged rollouts of software applications, in accordance with one or more aspects of the present disclosure.

FIG. 4 is a flowchart illustrating an example operation of the computing device, such as an ISS, that is configured to output an indication of an alternative application, in accordance with one or more aspects of the present disclosure. The process of FIG. 4 may be performed by one or more processors of a computing device, such as ISS 117, 217 as illustrated in FIG. 1 and FIG. 2, respectively. For purposes of illustration only, FIG. 4 is described below within the context of ISS 117 and ISS 217 of FIG. 1 and FIG. 2, respectively.

ISS 217 may receive consent to store user data (402). ISS 217 may analyze and store information associated with a user of computing device 110 if the user affirmatively consents to such collection of information. ISS 217 may further provide opportunities for the user to withdraw consent and in which case, ISS 217 may cease collecting or otherwise retaining the information associated with that particular user. Responsive to receiving user consent to store user data, ISS 217 may store information about one or more computing devices that are in a test pool (e.g., within data stores 260).

ISS 217 may receive an updated version of an application (404). For instance, ISS 217 may include an application repository module 226 that provides access to a plurality of applications. Application repository module 226 may include one or more versions of a particular application. An application developer may update an application (e.g., to provide new features or fix errors) to ISS 217. ISS 217 may receive the updated version of the application from the application developer and may dynamically generate a test pool (e.g., computing device 118 of FIG. 1) to receive and test the updated version of the application during a first stage of a multi-stage rollout.

In some examples, AVMM 228 of ISS 217 determines whether the candidate computing device should be included in the test pool by determining whether the candidate computing device (e.g. computing device 110) contributes additional test scope for the updated version of the application beyond existing test scope for the updated version of the application that is contributed by the group of computing devices that are already in the test pool (e.g., computing devices 118) (406). AVMM 228 may determine whether the candidate computing device contributes additional test scope based on the characteristics of the candidate computing devices (e.g., hardware, firmware, and/or software components of the candidate computing device). Additionally or alternatively, AVMM 228 may determine whether the candidate computing device contributes additional test scope based on the characteristics of the user of the candidate computing device. For instance, AVMM 228 may categorize one or more components of the candidate computing device and/or one or more characteristics of the user of the candidate computing device.

In some examples, AVMM 228 determines whether the candidate computing device contributes additional test scope by determining whether the components and/or user characteristics of the devices in the test pool are similar to the corresponding components and/or user characteristics of the devices already in the test pool. For example, AVMM 228 may determine that the candidate device is similar to a device in the test pool if a category of one or more components of the candidate device match the category of the corresponding components of a particular device in the test pool. In some instances, AVMM 228 determines that the candidate device is similar to a device in the test pool if a category of each component of the candidate device matches the category of the corresponding components of a particular device in the test pool.

As another example, AVMM 228 may determine whether the candidate computing device contributes additional test scope by determining a contribution score for the candidate computing device and comparing the contribution score to a threshold contribution score. For example, AVMM 228 may determine whether a particular component of the candidate computing device is similar to a corresponding component of a threshold quantity of computing devices in the test pool and may assign a higher contribution score to the candidate computing device in response to determining that the component of the candidate computing devices is not similar to the corresponding component of a threshold quantity of devices in the test pool.

Responsive to determining that the candidate computing device contributes additional test scope ("Yes" branch of 406), ISS 217 may add the candidate computing device to the group of computing devices in the test pool (408). For example, ISS 217 may add information about the characteristics of the candidate computing device to device characteristics data store 260A and information of the user of the candidate computing device to user characteristics data store 260B.

ISS 217 may provide the updated version of the application for installation at the candidate computing device (410). In some examples, ISS 217 automatically sends the updated version of the application to the candidate computing device. As another example, ISS 217 may send a message to the candidate computing device indicating that the updated version of the application is available for download and may send the updated version of the application to the candidate computing device in response to receiving a request to download from the candidate computing device.

Responsive to determining that the candidate computing device does not contribute additional test scope ("No" branch of 406), ISS 217 may temporarily refrain from providing the updated version of the application to the candidate computing device (412). For instance, ISS 217 may send information about an earlier version (e.g., the version prior to the newly updated version) of the application to the candidate computing device. In some examples, ISS 217 refrains from sending information about the updated version of the application until the first stage of the multi-stage rollout is complete and a second stage of the rollout begins.

The following numbered examples may illustrate one or more aspects of the disclosure:

Example 1

A method comprising: receiving, by a computing system that includes an application repository, an updated version of an application; determining, by the computing system, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices; and responsive to determining that the particular computing device contributes additional test scope for the updated version of the application beyond the existing test scope for the updated version of the application that is contributed by the group of computing devices: adding, by the computing system, the particular computing device to the group of computing devices; and providing, by the computing system, the updated version of the application for installation at the particular computing device.

Example 2

The method of example 1, further comprising: determining, by the computing system, the one or more characteristics of the particular computing device, wherein the one or more characteristics of the particular computing device include characteristics of at least one of: one or more hardware components of the particular computing device, one or more firmware components of the particular computing device, or one or more software components of the particular computing device.

Example 3

The method of any combination of examples 1-2, wherein determining whether the particular computing device contributes additional test scope for the updated version of the application beyond existing test scope for the updated version of the application that is contributed by the group of computing devices is further based on information associated with a user of the particular computing device.

Example 4

The method of any combination of examples 1-3, wherein determining whether the particular computing device contributes additional test scope for the updated version of the application comprises: determining, by the computing system, from a group of categories associated with each respective component of one or more components of the particular computing device, a category of each respective component of the one or more components of the particular computing device; determining, by the computing system, for each computing device in the group of computing devices, whether the category of each respective component of the particular computing device matches a category of each corresponding component of each respective computing device in the group of computing devices; in response to determining, for each computing device in the group of computing devices, that the category of at least one component of the particular computing device does not match the category of the corresponding component of each respective computing device in the group of computing devices, determining, by the computing system, that the particular computing device contributes additional test scope for the updated version of the application.

Example 5

The method of any combination of examples 1-3, wherein determining whether the particular computing device contributes additional test scope for the updated version of the application comprises: determining, by the computing system, a contribution score indicative of the probability that the characteristics of the particular computing increase the probability of detecting errors in the updated version of the application; determining, by the computing system, whether the contribution score satisfies a threshold contribution score; and responsive to determining that the contribution score satisfies the threshold contribution score, determining that the particular computing device contributes additional test scope for the updated version of the application beyond existing test scope for the updated version of the application that is contributed by the group of computing devices.

Example 6

The method of example 5, wherein determining the contribution score comprises: determining, by the computing system, from a group of categories associated with a first component of one or more components of the particular computing device, a category of the first component of the particular computing device; determining, by the computing system, a quantity of computing devices in the group of computing devices that include a first component of the same category as the category of the first component of the particular computing device; increasing, by the computing system, the contribution score in response to determining that the quantity of computing devices that include the first component of the same category as the first component of the particular computing device does not satisfy the threshold quantity of computing devices.

Example 7

The method of any combination of examples 5-6, wherein the threshold contribution score is variable, the method further comprising determining, by the computing system, the threshold contribution score based on: a value generated by a random number generator, or a number of computing devices in the group of computing devices.

Example 8

The method of any combination of examples 1-7, further comprising: determining, by the computing system, that an earlier version of the application is installed at the particular computing device; and sending, by the computing system, to the particular computing device for display at the particular computing device, an indication of the updated version of the application, wherein providing the updated version of the application for installation at the particular computing device comprises: responsive to receiving a request to update the application from the earlier version to the updated version, sending, by the computing system and to the particular computing device, the updated version of the application.

Example 9

A computing system comprising: at least one processor; and a memory comprising instructions that, when executed by the at least one processor, cause the at least one processor to: receive an updated version of an application; determine, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices; and responsive to determining that the particular computing device contributes additional test scope for the updated version of the application beyond the existing test scope for the updated version of the application that is contributed by the group of computing devices: add the particular computing device to the group of computing devices; and provide the updated version of the application for installation at the particular computing device.

Example 10

The computing system of example 9, wherein the instructions further cause the at least one processor to: determine the one or more characteristics of the particular computing device, wherein the one or more characteristics of the particular computing device include characteristics of at least one of: one or more hardware components of the particular computing device, one or more firmware components of the particular computing device, or one or more software components of the particular computing device.

Example 11

The computing system of any combination of examples 9-10, wherein the instructions cause the at least one processor to determine whether the particular computing device contributes additional test scope for the updated version of the application beyond existing test scope for the updated version of the application that is contributed by the group of computing devices based on information associated with a user of the particular computing device.

Example 12

The computing system of any combination of examples 9-11, wherein the instructions cause the at least one processor to determine whether the particular computing device contributes additional test scope for the updated version of the application by at least causing the at least one processor to: determine, from a group of categories associated with each respective component of one or more components of the particular computing device, a category of each respective component of the one or more components of the particular computing device; determine, for each computing device in the group of computing devices, whether the category of each respective component of the particular computing device matches a category of each corresponding component of each respective computing device in the group of computing devices; in response to determining, for each computing device in the group of computing devices, that the category of at least one component of the particular computing device does not match the category of the corresponding component of each respective computing device in the group of computing devices, determine, that the particular computing device contributes additional test scope for the updated version of the application.

Example 13

The computing system of any combination of examples 9-11, wherein the instructions cause the at least one processor to determine whether the particular computing device contributes additional test scope for the updated version of the application by at least causing the at least one processor to: determine, a contribution score indicative of the probability that the characteristics of the particular computing device increase the probability of detecting errors in the updated version of the application; determine, whether the contribution score satisfies a threshold contribution score;

and responsive to determining that the contribution score satisfies the threshold contribution score, determine that the particular computing device contributes additional test scope for the updated version of the application beyond existing test scope for the updated version of the application that is contributed by the group of computing devices.

Example 14

The computing system of example 13, wherein the instructions cause the at least one processor to determine the contribution score by at least causing the at least one processor to: determine, from a group of categories associated with a first component of one or more components of the particular computing device, a category of the first component of the particular computing device; determine, a quantity of computing devices in the group of computing devices that include a first component of the same category as the category of the first component of the particular computing device; increase, the contribution score in response to determining that the quantity of computing devices that include the first component of the same category as the first component of the particular computing device does not satisfy the threshold quantity of computing devices.

Example 15

The computing system of any combination of examples 13-14, wherein the threshold contribution score is variable, and wherein the instructions further cause the at least one processor to determine the threshold contribution score based on: a value generated by a random number generator, or a number of computing devices in the group of computing devices.

Example 16

The computing system of any combination of examples 9-15, wherein the instructions further cause the at least one processor to: determine that an earlier version of the application is installed at the particular computing device; and send, to the particular computing device for display at the particular computing device, an indication of the updated version of the application, wherein the instructions cause the at least one processor to provide the updated version of the application for installation at the particular computing device by causing the at least one processor to: responsive to receiving a request to update the application from the earlier version to the updated version, send, to the particular computing device, the updated version of the application.

Example 17

A computer-readable storage medium encoded with instructions that, when executed by at least one processor of a computing device, cause the at least one processor to: receive an updated version of an application; determine, based at least in part on one or more characteristics of a particular computing device and one or more characteristics of a group of computing devices that excludes the particular computing device, whether the particular computing device contributes additional test scope for the updated version of the application beyond existing test scope for the updated version of the application that is contributed by the group of computing devices; and responsive to determining that the particular computing device contributes additional test scope for the updated version of the application beyond the existing test scope for the updated version of the application that is contributed by the group of computing devices: add the particular computing device to the group of computing devices; and provide the updated version of the application for installation at the particular computing device.

Example 18

The computer-readable storage medium of example 17, wherein the instructions further cause the at least one processor to: determine the one or more characteristics of the particular computing device, wherein the one or more characteristics of the particular computing device include characteristics of at least one of: one or more hardware components of the particular computing device, one or more firmware components of the particular computing device, or one or more software components of the particular computing device.

Example 19

The computer-readable storage medium of any combination of examples 17-18, wherein the instructions cause the at least one processor to determine whether the particular computing device contributes additional test scope for the updated version of the application by at least causing the at least one processor to: determine, from a group of categories associated with each respective component of one or more components of the particular computing device, a category of each respective component of the one or more components of the particular computing device; determine, for each computing device in the group of computing devices, whether the category of each respective component of the particular computing device matches a category of each corresponding component of each respective computing device in the group of computing devices; in response to determining, for each computing device in the group of computing devices, that the category of at least one component of the particular computing device does not match the category of the corresponding component of each respective computing device in the group of computing devices, determine, that the particular computing device contributes additional test scope for the updated version of the application.

Example 20

The computer-readable storage medium of any combination of example 17-18, wherein the instructions cause the at least one processor to determine whether the particular computing device contributes additional test scope for the updated version of the application by at least causing the at least one processor to: determine, a contribution score indicative of the probability that the characteristics of the particular computing device increase the probability of detecting errors in the updated version of the application; determine, whether the contribution score satisfies a threshold contribution score; and responsive to determining that the contribution score satisfies the threshold contribution score, determine that the particular computing device contributes additional test scope for the updated version of the application beyond existing test scope for the updated version of the application that is contributed by the group of computing devices.

Example 21

A system comprising means for performing any of the methods of examples 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a computing system that includes an application repository, an updated version of an executable application;
   determining, by the computing system, based at least in part on one or more characteristics of a particular computing device and one or more characteristics of a group of computing devices that excludes the particular computing device,
   whether the particular computing device contributes additional test scope for the updated version of the executable application beyond existing test scope for the updated version of the executable application that is contributed by the group of computing devices; and
   responsive to determining that the particular computing device contributes additional test scope for the updated version of the executable application beyond the existing test scope for the updated version of the executable application that is contributed by the group of computing devices:
      adding, by the computing system, the particular computing device to the group of computing devices; and
      sending, by the computing system, the updated version of the executable application to the particular computing device for installation at the particular computing device.

2. The method of claim 1, wherein determining whether the particular computing device contributes additional test scope for the updated version of the executable application comprises:
   determining, by the computing system, from a group of categories associated with each respective component of one or more components of the particular computing device,
   a category of each respective component of the one or more components of the particular computing device;
   determining, by the computing system, for each computing device in the group of computing devices,
   whether the category of each respective component of the particular computing device matches a category of each corresponding component of each respective computing device in the group of computing devices; in response to determining, for each computing device in the group of computing devices, that the category of at least one component of the particular computing device does not match the category of the corresponding component of each respective computing device in the group of computing devices,
   determining, by the computing system, that the particular computing device contributes additional test scope for the updated version of the executable application.

3. The method of claim 1, wherein determining whether the particular computing device contributes additional test scope for the updated version of the executable application comprises:
   determining, by the computing system, a contribution score indicative of a probability that the characteristics of the particular computing device increase a probability of detecting errors in the updated version of the executable application;

determining, by the computing system, whether the contribution score satisfies a threshold contribution score; and responsive to determining that the contribution score satisfies the threshold contribution score, determining that the particular computing device contributes additional test scope for the updated version of the executable application beyond existing test scope for the updated version of the executable application that is contributed by the group of computing devices.

4. The method of claim 3, wherein determining the contribution score comprises:

determining, by the computing system, from a group of categories associated with a first component of one or more components of the particular computing device, a category of the first component of the particular computing device;

determining, by the computing system, a quantity of computing devices in the group of computing devices that include a first component of the same category as the category of the first component of the particular computing device;

adjusting, by the computing system, the contribution score in response to determining that the quantity of computing devices that include the first component of the same category as the first component of the particular computing device is less than the threshold quantity of computing devices.

5. The method of claim 4, wherein the threshold contribution score is variable, the method further comprising determining, by the computing system, the threshold contribution score based on:

a value generated by a random number generator, or a number of computing devices in the group of computing devices.

6. The method of claim 1, further comprising:

determining, by the computing system, the one or more characteristics of the particular computing device, wherein the one or more characteristics of the particular computing device include characteristics of at least one of:

one or more hardware components of the particular computing device, one or more firmware components of the particular computing device, or one or more software components of the particular computing device.

7. The method of claim 1, wherein determining whether the particular computing device contributes additional test scope for the updated version of the executable application beyond existing test scope for the updated version of the executable application that is contributed by the group of computing devices is based on information associated with a user of the particular computing device.

8. The method of claim 1, further comprising:

determining, by the computing system, that an earlier version of the executable application is installed at the particular computing device; and sending, by the computing system, to the particular computing device for display at the particular computing device, an indication of the updated version of the executable application, wherein sending the updated version of the executable application for installation at the particular computing device comprises:

responsive to receiving a request to update the executable application from the earlier version to the updated version, sending, by the computing system and to the particular computing device, the updated version of the executable application.

9. The method of claim 1, wherein the particular computing device is a first computing device, and wherein the group of computing devices that excludes the first computing device excludes a second computing device, the method further comprising:

determining, by the computing system, based at least in part on one or more characteristics of a second computing device and the one or more characteristics of the group of computing devices, whether the second computing device contributes additional test scope for the updated version of the executable application beyond existing test scope for the updated version of the executable application that is contributed by the group of computing devices; and responsive to determining that the second computing device does not contribute additional test scope for the updated version of the executable application beyond the existing test scope for the updated version of the executable application that is contributed by the group of computing devices, refraining, by the computing system, from sending the updated version of the executable application to the second computing device.

10. The method of claim 9, further comprising:

further responsive to determining that the second computing device does not contribute additional test scope for the updated version of the executable application beyond the existing test scope for the updated version of the executable application that is contributed by the group of computing devices, sending, by the computing system and to the second computing device for installation, an earlier version of the executable application.

11. A computing system comprising:

at least one processor; and a memory comprising instructions that, when executed by the at least one processor, cause the at least one processor to:

receive an updated version of an executable application;

determine, based at least in part on one or more characteristics of a particular computing device and one or more characteristics of a group of computing devices that excludes the particular computing device, whether the particular computing device contributes additional test scope for the updated version of the executable application beyond existing test scope for the updated version of the executable application that is contributed by the group of computing devices; and responsive to determining that the particular computing device contributes additional test scope for the updated version of the executable application beyond the existing test scope for the updated version of the executable application that is contributed by the group of computing devices:

add the particular computing device to the group of computing devices; and send the updated version of the executable application to the particular computing device for installation at the particular computing device.

12. The computing system of claim 11, wherein the instructions further cause the at least one processor to:
  determine the one or more characteristics of the particular computing device, wherein the one or more characteristics of the particular computing device include characteristics of at least one of:
  one or more hardware components of the particular computing device,
  one or more firmware components of the particular computing device, or
  one or more software components of the particular computing device.

13. The computing system of claim 11, wherein the instructions cause the at least one processor to determine whether the particular computing device contributes additional test scope for the updated version of the executable application beyond existing test scope for the updated version of the executable application that is contributed by the group of computing devices based on information associated with a user of the particular computing device.

14. The computing system of claim 13, wherein the instructions cause the at least one processor to determine whether the particular computing device contributes additional test scope for the updated version of the executable application by at least causing the at least one processor to:
  determine, from a group of categories associated with each respective component of one or more components of the particular computing device, a category of each respective component of the one or more components of the particular computing device;
  determine, for each computing device in the group of computing devices, whether the category of each respective component of the particular computing device matches a category of each corresponding component of each respective computing device in the group of computing devices; and
  in response to determining, for each computing device in the group of computing devices, that the category of at least one component of the particular computing device does not match the category of the corresponding component of each respective computing device in the group of computing devices, determine, that the particular computing device contributes additional test scope for the updated version of the executable application.

15. The computing system of claim 11, wherein the instructions cause the at least one processor to determine whether the particular computing device contributes additional test scope for the updated version of the executable application by at least causing the at least one processor to:
  determine, a contribution score indicative of a probability that the characteristics of the particular computing device increase a probability of detecting errors in the updated version of the executable application;
  determine, whether the contribution score satisfies a threshold contribution score; and
  responsive to determining that the contribution score satisfies the threshold contribution score, determine that the particular computing device contributes additional test scope for the updated version of the executable application beyond existing test scope for the updated version of the executable application that is contributed by the group of computing devices.

16. The computing system of claim 15, wherein the instructions cause the at least one processor to determine the contribution score by at least causing the at least one processor to:
  determine, from a group of categories associated with a first component of one or more components of the particular computing device, a category of the first component of the particular computing device;
  determine, a quantity of computing devices in the group of computing devices that include a first component of the same category as the category of the first component of the particular computing device; and
  increase, the contribution score in response to determining that the quantity of computing devices that include the first component of the same category as the first component of the particular computing device does not satisfy the threshold quantity of computing devices.

17. The computing system of claim 15, wherein the threshold contribution score is variable, and wherein the instructions further cause the at least one processor to determine the threshold contribution score based on
  a number of computing devices in the group of computing devices.

18. The computing system of claim 11, wherein the instructions further cause the at least one processor to:
  determine that an earlier version of the executable application is installed at the particular computing device; and
  send, to the particular computing device for display at the particular computing device, an indication of the updated version of the executable application,
  wherein the instructions cause the at least one processor to send the updated version of the executable application for installation at the particular computing device by causing the at least one processor to:
    responsive to receiving a request to update the executable application from the earlier version to the updated version, send, to the particular computing device, the updated version of the executable application.

19. A computer-readable storage medium encoded with instructions that, when executed by at least one processor of a computing device, cause the at least one processor to:
  receive an updated version of an executable application;
  during a first stage of a multi-stage rollout of the executable application:
    send the updated version of the executable application to a first group of computing devices that excludes a particular computing device;
    after sending the updated version of the executable application to the first group of computing devices, determine, based at least in part on one or more characteristics of the particular computing device and one or more characteristics of the first group of computing devices, whether to send the updated version of the executable application to the particular computing device as part of the first stage of the multi-stage rollout; and
    responsive to determining to send the updated version of the executable application to the particular computing device as part of the first stage of the multi-stage rollout of the executable application,
      send the updated version of the executable application to the particular computing device for installation at the particular computing device; and
  during a second stage of the multi-stage rollout of the executable application that occurs after the first stage of the multi-stage rollout of the executable application, send the updated version of the executable application to a second group of computing devices that is different from the first group of computing devices and is larger than the first group of computing devices.

20. The computer-readable storage medium of claim 19, wherein the instructions further cause the at least one processor to:
  determine the one or more characteristics of the particular computing device, wherein the one or more characteristics of the particular computing device include characteristics of at least one of:
  one or more hardware components of the particular computing device,
  one or more firmware components of the particular computing device, or
  one or more software components of the particular computing device.

21. The computer-readable storage medium of claim 19, wherein the instructions cause the at least one processor to determine whether to send the updated version of the executable application to the particular computing device as part of the first stage of the multi-stage rollout by at least causing the at least one processor to:
  determine, from a group of categories associated with each respective component of one or more components of the particular computing device, a category of each respective component of the one or more components of the particular computing device;
  determine, for each computing device in the group of computing devices, whether the category of each respective component of the particular computing device matches a category of each corresponding component of each respective computing device in the group of computing devices; and
  in response to determining, for each computing device in the group of computing devices, that the category of at least one component of the particular computing device does not match the category of the corresponding component of each respective computing device in the group of computing devices, determine, to send the updated version of the executable application to the particular computing device as part of the first stage of the multi-stage rollout.

22. The computer-readable storage medium of claim 19, wherein the instructions cause the at least one processor to determine whether to send the updated version of the executable application to the particular computing device as part of the first stage of the multi-stage rollout by at least causing the at least one processor to:
  determine, a contribution score indicative of a probability that the characteristics of the particular computing device increase a probability of detecting errors in the updated version of the executable application;
  determine, whether the contribution score satisfies a threshold contribution score; and
  responsive to determining that the contribution score satisfies the threshold contribution score, determine to send the updated version of the executable application to the particular computing device as part of the first stage of the multi-stage rollout.

* * * * *